Figure 1:
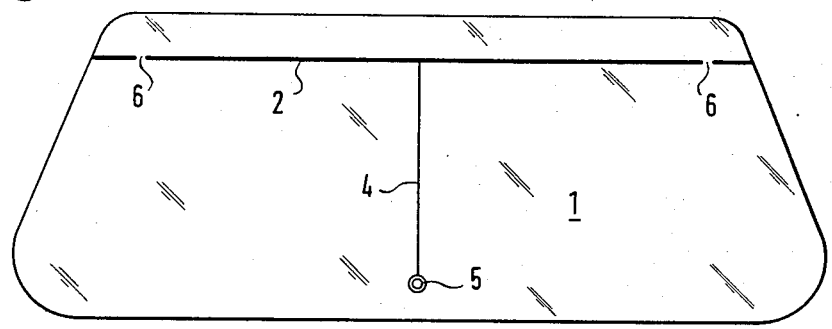

United States Patent [19]

Kunert et al.

[11] 3,810,180

[45] May 7, 1974

[54] MOTOR VEHICLE WINDSHIELD WITH INCORPORATED ANTENNA

[75] Inventors: Heinz Kunert, Cologne; Heinz Moebs, Herzogenrath; Gerd Sauer, Broichweiden, all of Germany

[73] Assignee: Saint-Gobain Industries, Neuilly-sur-Seine, France

[22] Filed: May 14, 1971

[21] Appl. No.: 143,558

[30] Foreign Application Priority Data

May 15, 1970 Germany............................ 2023823

[52] U.S. Cl. ................................................ 343/713
[51] Int. Cl. ............................................. H01q 1/32
[58] Field of Search ............ 343/711, 712, 713, 873

[56] References Cited
UNITED STATES PATENTS

| | | | |
|---|---|---|---|
| 3,020,550 | 2/1962 | Beever | 343/795 |
| 3,728,732 | 4/1973 | Igarashi | 343/713 |
| 3,484,584 | 12/1969 | Shaw | 343/713 |
| 3,576,576 | 4/1971 | Jensen | 343/873 |
| 3,543,272 | 11/1970 | Zawodniak | 343/713 |
| 3,579,243 | 5/1971 | Dickason | 343/713 |
| 3,599,214 | 8/1971 | Altmayer | 343/713 |
| 3,414,902 | 12/1968 | Shaw | 343/713 |

FOREIGN PATENTS OR APPLICATIONS

| | | | |
|---|---|---|---|
| 647,665 | 12/1950 | Great Britain | 343/705 |

Primary Examiner—Eli Lieberman
Attorney, Agent, or Firm—Pennie & Edmonds

[57] ABSTRACT

A window or the like, such as the windshield of an automotive vehicle, comprising electrically conductive lines constituting an antenna for receiving electric waves from space.

1 Claim, 9 Drawing Figures

PATENTED MAY 7 1974 3,810,180

SHEET 1 OF 2

INVENTORS
HEINZ KUNERT
HEINZ MOEBS
GERD SAUER

BY: *Bauer and Seymour*
ATTORNEYS

MOTOR VEHICLE WINDSHIELD WITH INCORPORATED ANTENNA

This invention relates to windshields and the like for vehicles, comprising one or more horizontally disposed electrically conductive lines serving as an antenna.

The present invention relates in part to the technique of applying electrical conductors to the surfaces of the glass or plastic elements of a windshield or the like, such as by impression, printing and the like. An advantage is taken of this technique in a novel manner to avoid an unfavorable influence on the field of vision while improving the reception and output or delivery capabilities of the antenna. Favorable results are attained according to the invention by placing the horizontally disposed antenna conductor in the upper portion of the windshield, but outside the zone of adverse electrical influence of the metallic parts or frame in which the glass elements are mounted, and placing at or near the middle of the windshield one or more vertical conductors connected to the horizontal conductor and terminating near the lower edge of the windshield outside the zone of adverse electrical influence of the metallic mounting and preferably at an output terminal which permits easy connection to a cable (not shown) leading to a suitable receiving instrument, such as a radio receiver.

Receiving apparatus currently in use require that the antenna conductors and the connection with the conducting cable to the receiver should be sufficiently remote from metallic portions of the windshield frame so that, taking into account the capacity of the connecting cable, the total capacity of the window pane should be less than 100 pF (picofarad) and preferably about 80 pF. In general, this leads to removing the conductors and cable connection several centimeters from the metallic portions of the window frame. We have observed that windshield antenna thus conceived assure very good reception.

It is essentially the center conductors which assure and strengthen the reception of the signal. Therefore, according to another characteristic of the invention, the center or median vertical conductor or conductors have a breadth clearly less than the breadth of the horizontal conductor or conductors. Thus, the breadth of each center vertical conductor is advantageously less than about 0.5 mm and is preferably in the range of 0.1 mm to 0.4 mm, while the horizontal conductors may have a breadth of as much as several millimeters, preferably in the range of 0.4 mm to 2 mm. We have observed that without adversely affecting the reception performance, the optical characteristics of the windshield are considerably improved by this feature. One would think that it would be undesirable to place conductors in the middle field of vision of a windshield. Furthermore, one would think that the placing of a single fine or narrow conductor in the center field of vision would give unsatisfactory results. It has been established, however, that prejudgment in this regard is not well founded, and that the placing of a single median conductor will permit obtaining good results, even if the width of this conductor is only 0.3 mm or even less, provided that the width of the horizontal conductor is not too reduced.

The characteristic of the invention which contemplates a differential between the width of the horizontal conductors and the width of the vertical conductors, the former being wider than the latter, facilitates the fabrication of the windshield and reduces to a minimum the loss or waste during application of the antenna conductors to the supporting surfaces by impression, printing or the like, such waste being proportional to the length of the conductors and inversely proportional to their width.

Antenna conductors in conformance with the invention may be applied as well to windshields or the like made of a single sheet of safety glass as to laminated glass windshields. In the case of windshields made of a single sheet of safety glass, the conductors are preferably imprinted on the surface thereof which faces the interior of the vehicle. In the case of laminated glass windshields, the conductors are preferably placed on the free or open face of the glass layer toward the interior of the vehicle, but the same may also be applied to the surfaces of the glass in contact with the layer of plastic material inserted between the glass sheets.

According to a preferred form of the invention, one or more vertical conductors are provided as are the horizontal conductors in the form of imprinted bands or strips. In the case of laminated glass panes, it is, however, possible as a variation to utilize for the vertical conductors some thin or fine metal wires or filaments having a diameter of about 0.1 mm that are embedded in the inserted layer of plastic material after soldering to the imprinted horizontal conductors.

If it is considered advantageous from the point of view of appearance that the horizontal conductors extend from one vertical edge of the window pane to the opposite vertical edge, the conductive bands may be disposed from one edge to the other, but the same are interrupted by gaps or cuts of very short length at a distance of several centimeters from the metal windshield frame. The undesirable influence of capacitance in this region is thus eliminated even though the conductors extend from the gaps to the surrounding metal frame.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

Figure 2:
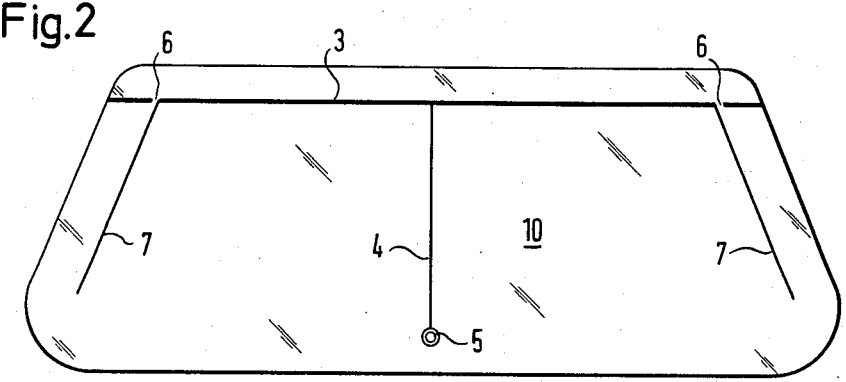
Figure 3:
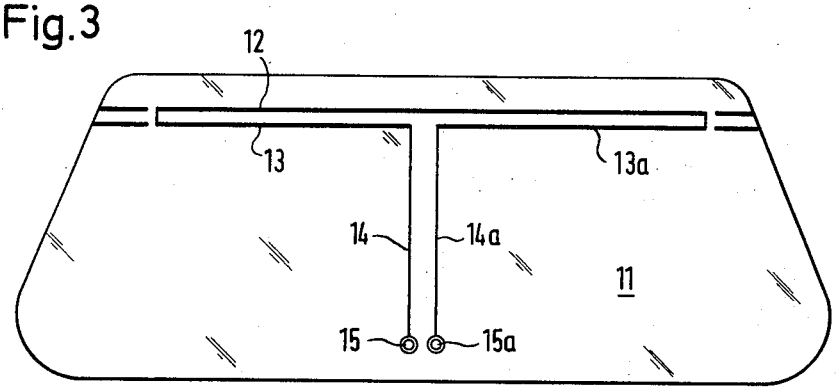

In the drawings, wherein like reference characters refer to like parts throughout the several views, FIGS. 1 to 3 are front elevation views of various examples of glass panes for windshields, with the conventional metal frame removed, showing the patterns formed by antenna conductors applied thereto in accordance with the invention; and FIGS. 4 to 9 are detail transverse sectional views showing the location or position of antenna conductors in relation to the thickness of various structural modifications of windshield panes in accordance with the invention.

In the example illustrated in FIG. 1, there is shown an antenna conductor 2 which extends parallel to the top edge of windshield 1. The distance of this conductor from the metal portions of the frame (not shown) which conventionally surrounds the glass pane is approximately 4 cm. This conductor may consist of an electrically conductive composition applied by impression in a known manner, such as a conductive silver paste that is applied in the form of a ribbon about 0.5 mm in width. At the center of windshield 1 there is applied a vertical conductor 4 which is in contact with the horizontal conductor 2 and is applied during the same operational phase of the assembly as the horizontal conductor. The width of conductor 4 may be only 0.2 mm to 0.3 mm so that its position at the center of the windshield will not appreciably or noticeably obstruct or jeopardize the field of vision of the driver of the vehicle or his passengers. Furthermore, the vertical conductor is located in the region of the windshield which permits most efficient reception. Conductor 4 terminates at its lower end at a distance of about 3 cm from metal portions of the frame across the lower edge of the windshield. At its lower extremity said conductor is suitably connected to a terminal 5 which permits ready connection of the antenna to a cable leading to the receiving apparatus.

Instead of a single horizontal conductor 2 several conductors disposed parallel to one another may be provided. In this case the distance between adjacent conductors may be of the order of several centimeters. The thickness of the conductors applied by impression is of secondary importance. One obtains good results when the conductors have a thickness in the range of 5 to 10 $\mu$m, a thickness which may be attained in a known manner such as by the technique of silk screening. It is possible also to reinforce the printed deposit by an electroplated deposit or by a metallic film or layer deposited without electrolysis.

In the example illustrated in FIG. 1 the horizontal conductor 2 extends the entire length of the windshield pane between its vertical edges. However, as seen at 6 in the vicinity of each end of the conductor a fine break or gap is situated at a distance of several centimeters from the metallic frame which conventionally surrounds the windshield pane 1. A satisfactory width for the gaps 6 may be about 0.4 mm.

The windshield or pane 10 with an antenna applied thereto as represented in FIG. 2 is analagous to the pane of FIG. 1. However, at the extremities of horizontal conductor 3, at gaps 6, there are connected two antenna conductors 7 which extend toward the base of the windshield parallel to the end edges thereof at a distance of several centimeters from the surrounding metallic frame. The conductors 7 are imprinted on the glass surface at the same time as the conductor 3, and the width thereof is less and corresponds approximately to the width of center conductor 4, that is to say, of the order of 0.1 mm to 0.4 mm.

In FIG. 3 there is represented a windshield 11 equipped with an antenna of the folded dipole type. The horizontal branches 12, 13 and 13a of this dipole antenna have a width of about 0.5 mm, while each of the vertical branches 14, 14a has a width of from 0.2 mm to 0.3 mm only. At the lower extremities of branches 14, 14a suitable connecting terminals 15, 15a may be provided for the fixation of cables connected with a receiving instrument. The antenna conductors are, as described above, disposed on the surface of the pane 10 at a distance of at least several centimeters from the metal of the frame surrounding the glass pane.

Figure 4:
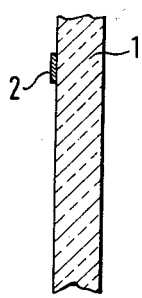

In FIG. 4 there is represented in section on an enlarged scale the disposition of conductor 2 on the surface of a windshield made of a single layer or pane of safety glass. This conductor may be advantageously constituted by a ribbon of electrically conductive silver paste which may be applied at ambient temperature and afterwards baked on the surface of the glass at about 600° C. In the case of bent sheets of glass, the baking of the conductive paste may be advantageously effected in the course of the bending operation. In the case of panes made of a single layer of safety glass, the reheating of the pane is beneficial over and above the operations of bending and of baking the conductors for obtaining a thermal tempering by rapid cooling.

Figure 5:
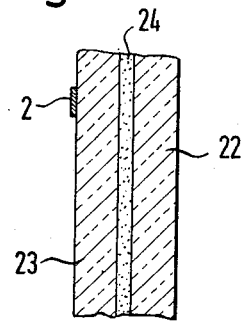

Another form of windshield is illustrated in FIG. 5. This form consists of a laminated glass pane constituted by two sheets of glass 22 and 23 glued together by an inserted layer of plastic material 24 in a known manner. The antenna conductor is applied on the outer or free face of layer 23 directed toward the interior of the motor vehicle.

Figure 6:
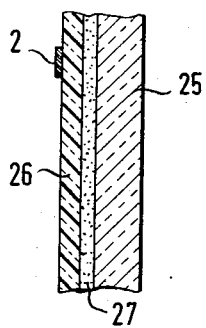

In place of an interior sheet of glass 23 one may also utilize a layer 26 made of transparent plastic material. One such embodiment is illustrated in FIG. 6 in which the layer 25 is a sheet of silicate glass, and the interior layer 26 is plastic material adhered to glass sheet 25 by means of an inserted layer 27 of glue. In this embodiment the antenna conductor 2 is disposed on the free or outer face of plastic sheet 26. In this case the antenna conductor may consist of a known material which does not require high baking temperatures. The application of the antenna conductor to the layer of plastic is advantageous, since the artisan has at his disposal satisfactory known processes for impressing the same on sheets of plastic.

Figure 7:
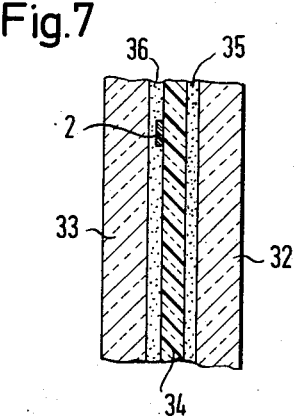

The embodiment of FIG. 7 takes advantage of the facility with which one can apply conductors to a support of plastic material without subjecting the conductors to the danger of mutilation, such as by scratching, as could occur on the surface of the lamination directed toward the interior of the vehicle. The pane is constituted by five superposed layers among which the two exterior layers 32 and 33 are of silicate glass. The layer of plastic 34 situated in the center of the laminated structure has the antenna conductor applied thereto before being glued to the glass layers 32 and 33 by suitable layers of glue 35 and 36.

Figure 8:
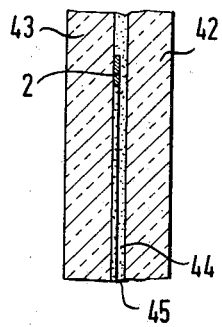

FIG. 8 also represents a partial section of the laminated pane of a windshield. The fundamental layers 42 and 43 constituting the laminations are glued together by means of an inserted sheet or layer 44 of plastic material, such as polyvinyl butyral. The horizontal conductor 2 is applied to the face of glass sheet 43 which is in contact with layer 44. Center vertical conductor 45 is not imprinted but is constituted by a metal wire or thread having a diameter of about 0.1 mm which is set in the layer 44. The wire 45 is in electrical contact with conductor 2 to which it may be soldered, by way of example.

Figure 9:
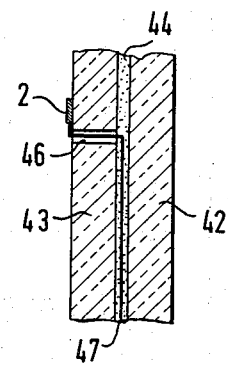

A further modification is illustrated in FIG. 9 wherein the horizontal conductor 2 is applied on the face of the layer of glass 43 facing the interior of the vehicle. The center conductor 47 is, as in FIG. 8, embedded or set in the inserted plastic layer 44 between laminations 42 and 43. The electrical connection between conductors 2 and 47 is obtained by providing in the glass layer 43 an opening 46 through which the wire 47 passes and extends on the exterior surface of sheet 43 into contact with conductor 2.

The output or delivery ends of center vertical conductors 45 and 47 may be connected with suitable output terminals, such as terminal 5 (FIG. 1) through openings, such as opening 46, provided in glass layer 43 a few centimeters above the lower edge thereof.

What is claimed is:

1. A windshield for vehicles comprising a transparent glass pane, a metallic frame surrounding the pane, and a unitary T-shaped antenna integral with the pane comprising a cross-bar conductor spaced a short distance from the frame at the top and vertical side edges of the pane, a terminal mounted on and centrally of the pane a short distance from the frame at the bottom edge of the pane, said short distances being at least about 4 cm., and a vertical conductor located centrally of the pane connected between the cross-bar conductor and said terminal, said conductors being composed of silver paste applied to the glass by the silk screen process and baked thereon, the width of said vertical conductor being less than 0.4 mm. and the width of the cross-bar conductor being greater than that of the vertical conductor and within the range of 0.4 to 2 mm.

* * * * *